No. 888,115. PATENTED MAY 19, 1908.
J. F. O'CONNOR.
ANTIFRICTION SIDE BEARING FOR RAILWAY CARS.
APPLICATION FILED SEPT. 5, 1905.
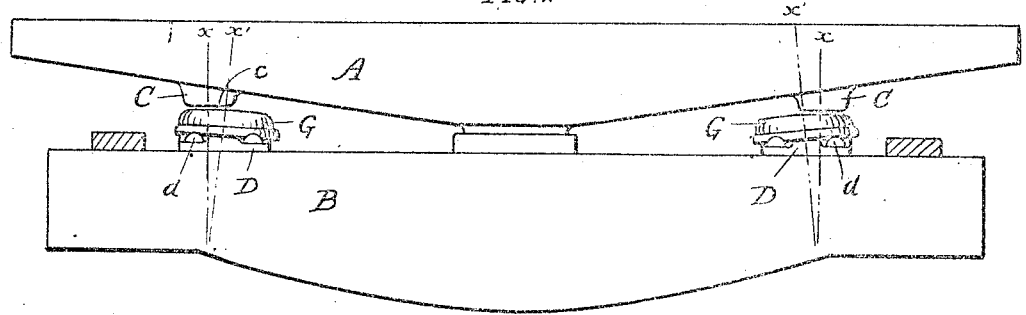
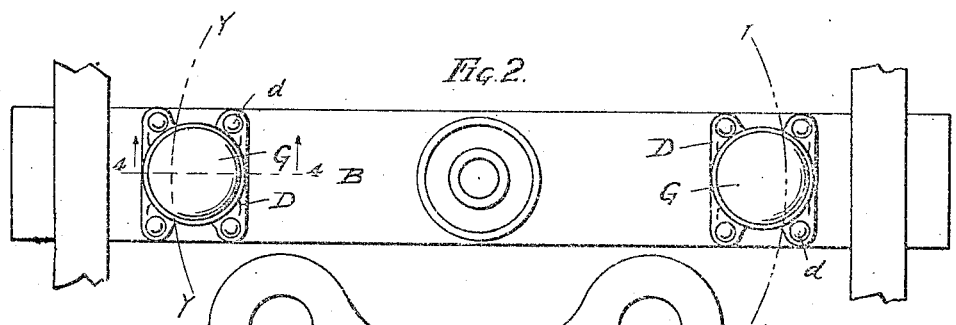
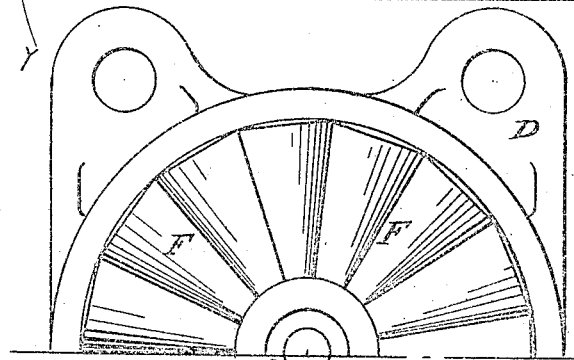
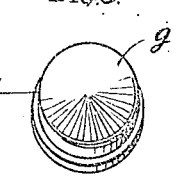
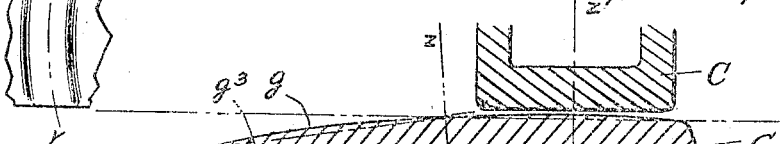
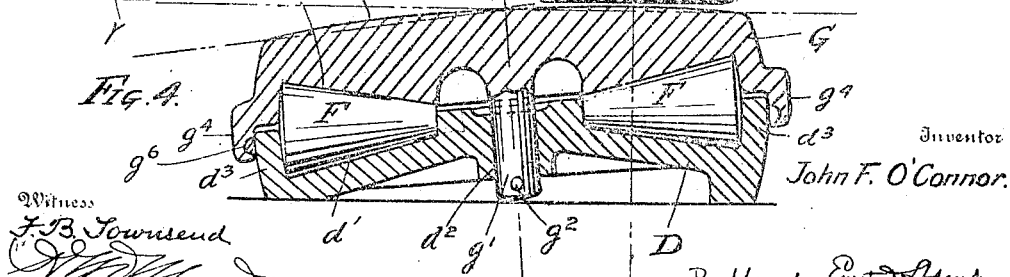
Inventor
John F. O'Connor.
By Munday, Evarts & Adcock
his Attorneys
Witness
F. B. Townsend

UNITED STATES PATENT OFFICE.

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

ANTIFRICTION SIDE BEARING FOR RAILWAY-CARS.

No. 888,115.      Specification of Letters Patent.      Patented May 19, 1908.

Application filed September 5, 1905. Serial No. 276,922.

*To all whom it may concern:*

Be it known that I, JOHN F. O'CONNOR, a citizen of the United States, residing in Chicago, in the county of Cook and State of Illinois, have invented a new and useful Improvement in Antifriction Side Bearings for Railway-Cars, of which the following is a specification.

My invention relates to anti-friction side bearing for railway-cars.

In the constructions of rocker, roller, or anti-friction side bearings for railway-cars heretofore in use, serious objection and difficulty has been experienced owing to the fact that but a very limited travel can be secured without unduly increasing the total vertical thickness or height of the anti-friction bearing, as the available space between the body and truck bolsters for tandem bearing is, necessarily, of small extent owing to other conditions of car construction, and to the necessity and desirability of keeping the load as low as possible.

The object of my invention is to provide an anti-friction side bearing of a strong, simple, efficient and durable construction which will permit of any desired amount of anti-friction travel of one bolster in respect to the other, and which, at the same time, may be easily kept within the available space or vertical height for the same, which ordinarily is about two and one-half inches for the total vertical thickness of the anti-friction device.

My invention consists in the means I employ to practically accomplish this object or result; that is to say it consists, in connection with the upper bearing member secured to the body bolster and the lower bearing member secured to the truck bolster of a substantially horizontal but slightly inclined anti-friction or rotary circular disk, having a conical upper bearing face engaging the lower face of the upper bearing member which is secured to the body bolster, and interposed between the upper and lower bearing members, the anti-friction conical faced disk turning on an axis slightly inclined from the vertical, so that the line of contact between its conical face or tread and the face or tread of the upper bearing member, will always remain substantially horizontal or parallel with the face of said upper bearing member which is secured to the body bolster. A series of small cone rollers, or other anti-friction parts, are preferably interposed between the anti-friction conical faced rotary disk and the lower bearing member, the lower bearing member being preferably furnished with an annular race or track to receive the same. The conical bearing face of the axially inclined anti-friction rotary disk is, preferably, slightly rounded or curved to insure a better contact with the upper bearing member.

My invention also consists in the novel construction of parts and devices and in the novel combinations of parts and devices herein shown or described.

In the accompanying drawing, forming a part of this specification, Figure 1 is an elevation showing the body and truck bolsters of a car having anti-friction side bearings embodying my invention; Fig. 2 is a plan view with the body bolster removed; Fig. 3 is a partial detail plan view of the lower bearing member which is secured to the truck bolster with the small anti-friction cones in place thereon; Fig. 4 is an enlarged detail vertical section on line 4—4 of Fig. 2; Fig. 5 is a detail perspective view of the cone-faced anti-friction disk, and Fig. 6 is a detail bottom view of the upper bearing member which is secured to the body bolster.

In the drawing A represents the truck body, B the truck bolster of a railway car.

C is the upper bearing member of my side bearing, the same being rigidly secured to the body bolster.

D is the lower bearing member which is rigidly secured to the truck bolster by bolts $d$. The lower bearing member D has an annular conical tread or race $d^1$ to receive the small cones or rollers, or anti-friction parts F, which are preferably interposed between the lower bearing member and the axially inclined rotary conical-faced anti-friction disk G which is interposed between the upper and lower bearing members C, D. This inclined anti-friction disk G has a slightly rounded or curved upper bearing face $g$, and the disk rotates on an axis which is slightly inclined to the vertical, so that the line of contact between the disk G and the upper bearing member C will always be substantially horizontal or parallel to the bearing face or tread $c$ of the upper bearing member C, as will be readily understood from Figs. 1 and 4 of the drawing. The anti-friction conical faced inclined disk G is, preferably, rotatably combined with or mounted upon the lower bearing member D by means of an integral shaft or stud $g^1$ on one part which fits in a hole $d^2$ on the other part, a key $g^2$ being inserted through the stud $g^1$. The pivot or stud $g^1$ is, preferably, on the part G instead of the part D.
The anti-friction disk G is preferably furnished with a race or tread $g^3$ on its lower face to receive the cones or rollers F. The anti-friction disk G is, preferably, furnished with an annular flange $g^4$, which surrounds and embraces the corresponding annular flange $d^3$ on the lower bearing member D, these interengaging flanges additionally locking or rotatably securing the anti-friction disk and lower bearing member together, and serving to relieve the pivot stud $g^1$ from undue or severe strains. As the pivot or axis of the anti-friction disk G is inclined from the vertical, the annular conical tread $d^1$ for the conical rollers F to travel upon is correspondingly arranged as will be readily understood from Fig. 4 of the drawing. The pivot or axis about which the anti-friction disk G turns is located to one side, preferably to the inside, of a vertical line extending centrally through the upper bearing member C, as will be readily understood from the lines $x$ $x$ in Fig. 1. The curved lines $y$—$y$ on Fig. 2 also indicate this by showing the path or line of travel of the central bearing point of the upper bearing member C. In other words, the center or apex $x^1$ of the conical faced anti-friction disk G is to one side of the upper bearing member C, so that this upper bearing member C cannot contact with the central portion of the disk G. As the upper bearing member C contacts with the outside portion of the rotary disk G, the centers of movement about which the disk G and bearing C or bolster A turn or swing, are both on the same side instead of upon opposing sides of the contacting line between the rotary disk G and bearing C. The broken lines $z$ and $z^1$, in Fig. 4, indicate the inclination of the axis of the rotary disk G, and the eccentricity of such axis to the median line of the upper bearing member C. Between the interengaging flanges $d^3$ $g^4$ I preferably interpose fibrous or other packing $g^6$, one of the interengaging flanges having an annular groove to receive the packing. This serves to keep dust and cinders from the cones or rollers F.

I claim:

1. In an anti-friction side bearing for railway cars, the combination with an upper bearing member adapted to be secured to the body bolster, of a lower bearing member adapted to be secured to the truck bolster, and having an annular conical tread on its upper face, an axially inclined rotary disk, rotatable in respect both to the bearing member secured to the body bolster and in respect to the bearing member secured to the truck bolster, and having an upper face contacting with said upper bearing member and provided with an annular conical tread on its lower face, and a series of radially arranged conical rollers between said rotary disk and said lower bearing member, the axis about which said rotary disk turns being between said upper bearing member and the center about which the bolster turns, said conical rollers affording an extended support between said roller bearing member and said axially inclined rotary disk substantially as specified.

2. In an anti-friction side bearing for railway cars, the combination with an upper bearing member adapted to be secured to the body bolster, of a lower bearing member adapted to be secured to the truck bolster and having an annular conical tread on its upper face, an axially inclined rotary disk having an upper face contacting with said upper bearing member, and provided with an annular conical tread on its lower face, and a series of radially arranged conical rollers between said rotary disk and said lower bearing member, said rotary disk having an integral stud or shaft and said lower bearing member having a hole or bearing to receive said stud or shaft, substantially as specified.

3. In an anti-friction side bearing for railway cars, the combination with an upper bearing member adapted to be secured to the body bolster, of a lower bearing member adapted to be secured to the truck bolster and having an annular conical tread on its upper face, an axially inclined rotary disk having an upper face contacting with said upper bearing member, and provided with an annular conical tread on its lower face, and a series of radially arranged conical rollers between said rotary disk and said lower bearing member, said rotary disk and said lower bearing member having annular flanges serving as abutments for the outer ends of the conical rollers, and said rotary disk having an integral pivot stud fitting in the lower bearing member, substantially as specified.

4. In an anti-friction bearing for railway cars, the combination with an upper bearing member adapted to be secured to the body bolster, of a lower bearing member adapted to be secured to the truck bolster, and an axially inclined cone-faced anti-friction rotary disk interposed between the upper and lower bearing members, said lower bearing member and said anti-friction disk having interengaging annular flanges, and a packing interposed between said interengaging anlar flanges, substantially as specified.

JOHN F. O'CONNOR.

Witnesses:
H. M. MUNDAY,
PEARL ABRAMS.